(12) United States Patent
Rahiman et al.

(10) Patent No.: US 11,487,852 B2
(45) Date of Patent: Nov. 1, 2022

(54) BLOCKCHAIN-BASED LICENSE MANAGEMENT

(71) Applicant: Dell Products, L.P., Round Rock, TX (US)

(72) Inventors: Shinose Abdul Rahiman, Bangalore (IN); Chitrak Gupta, Bangalore (IN)

(73) Assignee: Dell Products, L.P., Round Rock, TX (US)

(*) Notice: Subject to any disclaimer, the term of this patent is extended or adjusted under 35 U.S.C. 154(b) by 131 days.

(21) Appl. No.: 16/018,564

(22) Filed: Jun. 26, 2018

(65) Prior Publication Data

US 2019/0392119 A1    Dec. 26, 2019

(51) Int. Cl.
| | | |
|---|---|---|
| *G06F 21/10* | (2013.01) | |
| *G06Q 30/06* | (2012.01) | |
| *H04L 9/32* | (2006.01) | |
| *H04L 9/06* | (2006.01) | |
| *H04L 9/00* | (2022.01) | |

(52) U.S. Cl.
CPC ........... *G06F 21/105* (2013.01); *G06Q 30/06* (2013.01); *H04L 9/3247* (2013.01); *G06Q 2220/18* (2013.01); *H04L 9/0637* (2013.01); *H04L 9/50* (2022.05)

(58) Field of Classification Search
CPC ..... G06F 21/105; G06Q 30/06; H04L 9/0637; H04L 9/3247
See application file for complete search history.

(56) References Cited

U.S. PATENT DOCUMENTS

| | | | | |
|---|---|---|---|---|
| 5,752,041 | A | * | 5/1998 | Fosdick ................ G06F 21/105 705/59 |
| 2009/0083856 | A1 | * | 3/2009 | Aisu .................... G11B 27/322 726/26 |
| 2016/0294839 | A1 | * | 10/2016 | Walline ................. H04L 63/105 |
| 2017/0091397 | A1 | * | 3/2017 | Shah ..................... H04L 9/3236 |
| 2017/0116693 | A1 | * | 4/2017 | Rae ..................... H04L 63/0478 |
| 2017/0161471 | A1 | * | 6/2017 | Brundridge ........... G06F 21/105 |
| 2017/0214522 | A1 | * | 7/2017 | Code .................. G06Q 20/3672 |
| 2018/0101848 | A1 | * | 4/2018 | Castagna .............. H04L 63/105 |
| 2018/0137512 | A1 | * | 5/2018 | Georgiadis ........... H04L 63/126 |
| 2018/0295133 | A1 | * | 10/2018 | Xu .......................... H04L 67/04 |

(Continued)

*Primary Examiner* — Jacob C. Coppola
*Assistant Examiner* — Terry Nathan Murray
(74) *Attorney, Agent, or Firm* — Fogarty LLP (57) ABSTRACT

Blockchain-based license management provides capabilities for managing licensable aspects of a plurality of IHSs (Information Handling Systems) participating in the blockchain comprised of individual license blocks that record licensing transactions. A licensing authority initiates the blockchain and modifies licensable aspects of a specific participating target IHS by distributing license blocks that include one or more license tokens and license logic specifying instructions for the target's evaluation of the license tokens. Each participating IHS validates the received license blocks and adds them to a local copy of the blockchain. If a participating IHS is the target, that IHS uses the license logic to determine licensing modifications indicated by the licensing token. Licensable aspects of the IHS may then be modified based on the determined licensing modifications. A participating IHSs may directly transfer licenses to another IHS through the transfer of license tokens and the corresponding license logic.

18 Claims, 5 Drawing Sheets

(56) References Cited

U.S. PATENT DOCUMENTS

| | | | |
|---|---|---|---|
| 2019/0036711 A1* | 1/2019 | Qiu | H04L 9/3268 |
| 2019/0287146 A1* | 9/2019 | Maitland | G06Q 30/04 |
| 2019/0295038 A1* | 9/2019 | Kozloski | G06Q 10/101 |
| 2019/0361917 A1* | 11/2019 | Tran | G06Q 40/04 |
| 2019/0384892 A1* | 12/2019 | Holland | G06F 16/2379 |
| 2020/0021446 A1* | 1/2020 | Roennow | H04L 63/0478 |

* cited by examiner

BLOCKCHAIN-BASED LICENSE MANAGEMENT

FIELD

This disclosure relates generally to the management of Information Handling Systems (IHSs), and more specifically, to license management for networks of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The operation of an IHS may require the use of various licenses. For instance, a license may be required in order to use certain features of an operating system utilized by an IHS. The use of software applications installed on an IHS may require licenses to operate and/or to utilize specific features of the software application. An IHS may include various hardware components that may require a license. These licenses may be managed as various types of files that are stored on the IHS and used to authorize the use of the licensed feature, application or component. Although various security measures may be utilized to protect the integrity of such license files, these license files that are stored on the IHS are nonetheless vulnerable to tampering.

SUMMARY

In various embodiments, methods are provided for managing licensable aspect of a first IHS (Information Handling System) of a plurality of IHSs participating in a blockchain. The methods may include: receiving a first block of the blockchain from a licensing authority, wherein the first block includes one or more license tokens and license logic; validating the received first block; if the received block is validated, adding the received first block to a local copy of the blockchain maintained by the first IHS; determining whether the first IHS is a target of the received first block; if the first IHS is a target, using the license logic to determine one or more licensing modifications indicated by the licensing token; and modifying one or more licensable aspects of the first IHS based on the one or more licensing modifications.

In various additional method embodiments, the received first block is validated based on confirmation of a digital signature included in the received block as corresponding to the licensing authority. In various additional method embodiments, the license token comprises a token balance indicating the duration of a license modification. In various additional method embodiments, the license logic comprises instructions for evaluating the license token. In various additional method embodiments, the license logic instructions are processed by a licensing virtual machine operating on the first IHS. In various additional method embodiments, the license logic comprises instructions directing the licensing virtual machine to issue periodic reports to the licensing authority. In various additional embodiments, the method may further include: generating a second block of the blockchain, wherein the second block comprises a transfer license token corresponding to a licensable aspect of the first IHS and a second IHS of the participating IHSs, and wherein the second block further comprises the license logic; and transmitting the second block to the participating IHSs. In various additional method embodiments, the licensing logic is utilized by the second IHS to determine one or more modifications to the licensable aspect of the second IHS indicated by the transfer license token.

In various additional embodiments, a first Information Handling System (IHS) of a plurality of IHSs participating in a blockchain includes: one or more processors; a baseboard management controller configured to operate a licensing virtual machine for managing licensable aspects of the first IHS, wherein the licensing virtual machine is configured to: receive a first block of the blockchain from a licensing authority, wherein the first block includes one or more license tokens and license logic; validate the received first block; if the received block is validated, add the received first block to a local copy of the blockchain maintained by the first IHS; determine whether the first IHS is a target of the received first block; if the first IHS is a target, use the license logic to determine one or more licensing modifications indicated by the licensing token; and a system memory coupled to the one or more processors, the system memory including program instructions stored thereon that, upon execution by the one or more processors, cause the IHS to: modify one or more licensable aspects of the first IHS based on the one or more licensing modifications determined by the licensing virtual machine operating on the baseboard management controller.

In various additional IHS embodiments, the license token comprises a token balance indicating the duration of a license modification. In various additional IHS embodiments, the license logic comprises instructions for evaluating the license token. In various additional IHS embodiments, the license logic instructions are processed by a licensing virtual machine operating on the first IHS. In various additional IHS embodiments, the license logic comprises instructions directing the licensing virtual machine to issue periodic reports to the licensing authority. In various additional IHS embodiments, the licensing virtual machine is further configured to: generate a second block of the blockchain, wherein the second block comprises a transfer license token corresponding to a licensable aspect of the first IHS and of a second IHS of the participating IHSs, and wherein the second block further comprises the license logic; and transmit the second block to the participating IHSs. In various additional IHS embodiments, the licensing logic is utilized by the second IHS to determine one or more modifications to the licensable aspect of the second IHS indicated by the transfer license token.

In various additional embodiments, methods are provided for managing licensable aspect of a plurality of IHSs (Information Handling Systems) participating in a blockchain. The method may include: generating a first block of the blockchain, wherein the first block includes a license token and license logic, and wherein the license token is targeted at a first IHS of the plurality of IHSs, and wherein the license token comprises a token balance indicating the duration of a license modification, and wherein the license logic is used by the first IHS to determine one or more licensing modifications to the first IHS that are indicated by the licensing token, and wherein the license logic comprises instructions directing the first IHS to issue periodic reports; transmitting the first block to the plurality of participating IHSs; receiving the one or more reports from the first IHS; based on the received one or more reports, determining an updated token balance for the license token; generating a second block of the blockchain, wherein the second block includes the license token and license logic, wherein the license token comprises the updated token balance; wherein the license logic is used by the first IHS to determine one or more additional licensing modifications to the first IHS indicated by the updated token balance of the licensing token.

In various additional method embodiments, the generated first block comprises a digital signature corresponding to a licensing authority. In various additional method embodiments, the license logic comprises instructions for evaluating the license token. In various additional method embodiments, the license logic instructions are processed by a licensing virtual machine operating on the first IHS. In various additional method embodiments, the methods may further include detecting the transfer of the license token from the first IHS to a second IHS of the plurality of IHSs.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
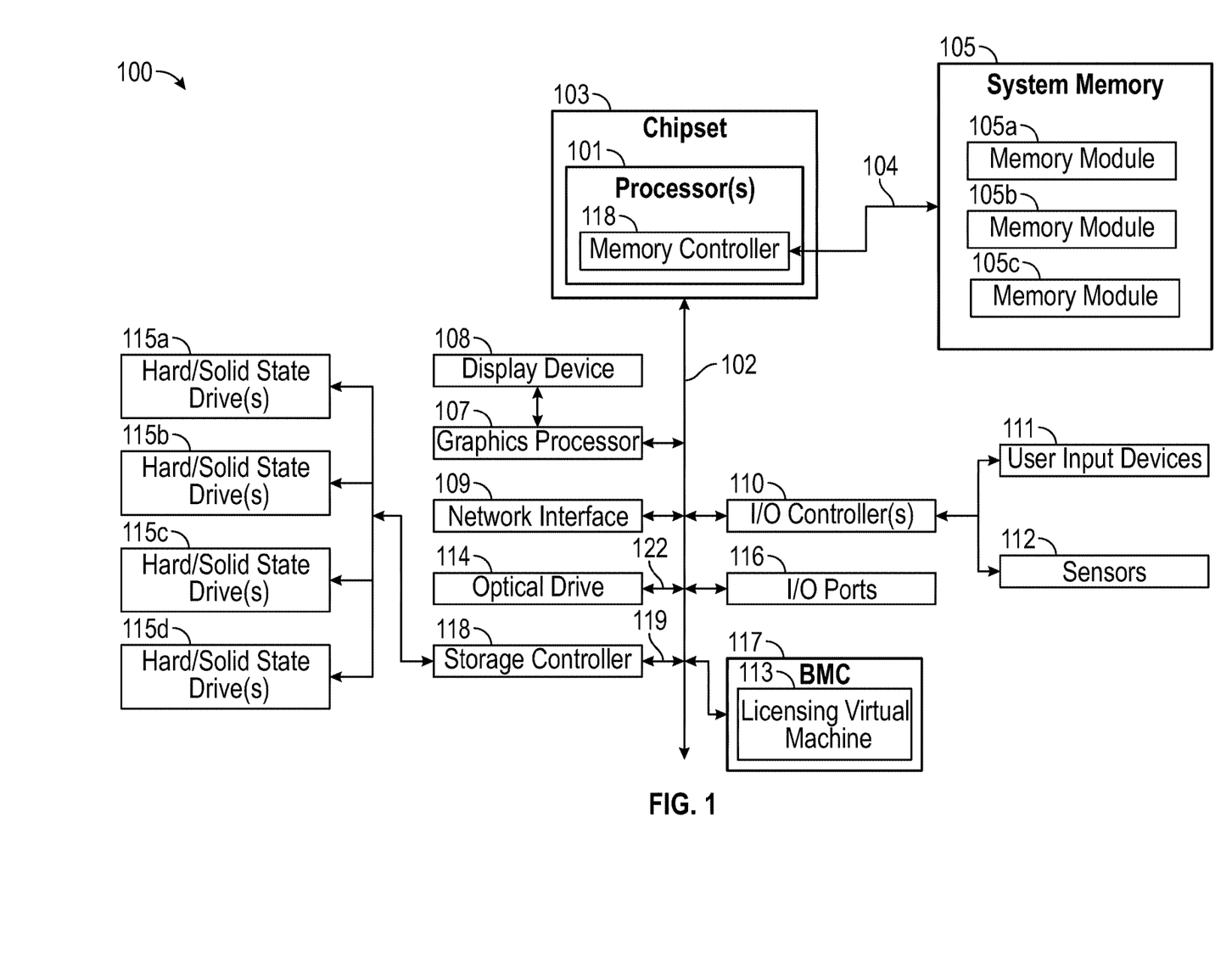
FIG. 1 is a block diagram depicting certain components of an IHS configured according to various embodiments for blockchain-based license management.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of an enterprise server computer comprised within an enterprise datacenter comprised of similar enterprise servers, other embodiments may be utilized.

FIG. 1 is a block diagram of an IHS 100 configured according to certain embodiments as a participant node in the described blockchain-based license management system. In various embodiments, IHS 100 may execute program instructions that cause IHS 100 to perform certain of the operations disclosed herein. While a single IHS 100 is illustrated in FIG. 1, IHS 100 may be a component of an enterprise datacenter system that may include any number of additional I HSs that may also be configured as participant nodes in the same or similar manner as IHS 100.

IHS 100 includes one or more processors 101, such as a Central Processing Unit (CPU), to execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104.

The system memory 105 that is coupled to processor 101 via the memory bus 104 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory.

In certain embodiments, the system memory 105 may be comprised of multiple removable memory modules. The system memory 105 of the illustrated embodiment includes three removable memory modules 105a, 105b and 105c. Each of the removable memory modules 105a-c may correspond to a motherboard memory socket that receives a removable memory module 105a-c, such as a DIMM (Dual In-line Memory Module), that can be coupled to the socket and then decoupled from the socket as needed. Other embodiments of IHS 100 may be configured with memory socket interfaces that correspond to different types of removable memory modules, such as a Dual In-line Package (DIP)

memory, a Single In-line Pin Package (SIPP) memory, a Single In-line Memory Module (SIMM), and/or a Ball Grid Array (BGA) memory.

IHS 100 utilizes a chipset 103 that may include one or more integrated circuits that are connect to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of buses to provide the illustrated pathways served by bus 102.

As illustrated, a variety of resources may be coupled to the processor(s) 101 of the IHS 100 through the chipset 103. For instance, chipset 103 may be coupled to a network interface 109, such as provided by a Network Interface Controller (NIC) that is coupled to the IHS 100 and allows the IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, the network interface 109 may be coupled to the chipset 103 via a PCIe bus.

Chipset 103 may also provide access to one or more display device(s) 108 via graphics processor 107. In certain embodiments, graphics processor 107 may be comprised within one or more video or graphics cards or an embedded controller installed as components of the IHS 100. Graphics processor 107 may generate display information and provide the generated information to one or more display device(s) 108 coupled to the IHS 100. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. The user input devices may interface with the I/O controller 110 through wired or wireless connections. Sensors 112 accessed via I/O controllers 110 may provide access to data describing environmental and operating conditions of IHS 100. Other components of IHS 100 may include one or more I/O ports 116 for communicating with peripheral external devices as well as various input and output devices. For instance, I/O 116 ports may include USB (Universal Serial Bus) ports, by which a variety of external devices may be coupled to IHS 100.

In the illustrated embodiment, IHS 100 includes four storage drives 115*a-d*. In various embodiments, the four storage drives 115*a-d* may include SAS (Serial Attached SCSI) magnetic disk drives, SATA (Serial Advanced Technology Attachment) magnetic disk drives, solid-state drives (SSDs) and other types of storage drives in various combinations. Each of the storage drives 115*a-d* may be located within the enclosure of the IHS 100, or alternatively one or more of the storage drives 115*a-d* may instead be external to IHS 100. One or more of the storage drives 115*a-d* may instead be located remotely from IHS 100 and may be configured as network attached storage devices. Using these four storage drives 115*a-d*, IHS 100 may be configured as a server that provides various services as a part of a cloud implementation of multiple servers that may be distributed across multiple physical locations. In certain embodiments, the four storage drives 115*a-d* may be components of a RAID (Redundant Array of Independent Disks) system.

In providing storage services, IHS 100 is may utilize a storage controller 118 that provides access to the four storage drives 115*a-d*. In certain embodiments, the storage controller 118 may be a RAID controller that is configured to provide access to storage drives 115*a-d* as components of a RAID system. In various embodiments, storage controller 118 may be comprised of hardware and software that is configured to provide storage and retrieval of data from the storage drives 115*a-d*. Storage controller 118 may be configured to provide access to the four storage drives 115*a-d* as a single logical storage device as part of a distributed data storage solution. Certain embodiments may utilize additional storage controllers that provide access to additional storage devices.

As illustrated, IHS 100 also includes a Baseboard Management Controller (BMC) 117 that provides capabilities for remote management of IHS 100. In certain embodiments, BMC 117 may be a service processor of the one or more processor 101 that utilize system memory 105. In other embodiment, BMC 117 may be a standalone processing module ora microcontroller with a dedicated processor and memory. In certain embodiments, BMC 117 may include instructions that are used to initialize and test components of IHS 100. In such embodiments, such instructions may utilize an interface provided by a BIOS (Basic Input/Output System) or UEFI (Unified Extensible Firmware Interface) system utilized by IHS 100 as a hardware abstraction interface for certain hardware components of IHS 100.

In certain embodiments, BMC 117 may provide tools by which an administrator may remotely monitor and manage aspect of IHS 100. For instance, various sensors 112 may be used to monitor and report parameters that may include: temperatures at various locations within the IHS 100, cooling fan speeds, error conditions, network contention, power status, and operating system (OS) status. The BMC 117 monitors such sensors 112 and may alert administrators if parameter thresholds or conditions are indicated. In certain embodiments, BMC 117 may provide a remote administration interface by which various administrative tasks may be performed by an administrator.

As illustrated in FIG. 1, the BMC 117 includes a licensing virtual machine 113 that is utilized in implementing the described blockchain-based license management. As a processing resource that is secured upon booting of the IHS 100, the BMC 117 provides a secure platform for running the licensing virtual machine 113, thus ensuring the integrity of the licensing management by the licensing virtual machine 113. In certain embodiments, the licensing virtual machine 113 may support a programming language that may be used in processing licensing logic that is distributed within the licensing blockchain. As described in additional detail below, each licensing block in a licensing blockchain may include a licensing token and licensing logic that, when processed by the licensing virtual machine 113, provides the instructions for evaluating the licensing token.

In certain embodiments, the BMC 117 may manage the initialization of IHS 100 in a manner that provides verification of the integrity of the hardware utilized by IHS, thus providing a capability for securely booting IHS 100. In certain embodiments, an BMC 117 may verify the hardware integrity of the IHS 100 immediately upon booting of the IHS 100 and before initialization of the operating system to be used by IHS 100. For instance, the BMC 117 may calculate a signature for certain hardware components of the IHS immediately upon booting. This signature may be compared against a trusted reference signature for each component in order to detect where any of the hardware components have been modified. Configured in this manner, BMC 117 provides a secure operating environment for the licensing virtual machine 113 and the blockchain-based licensed management system implemented using the licensing virtual machine.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2:
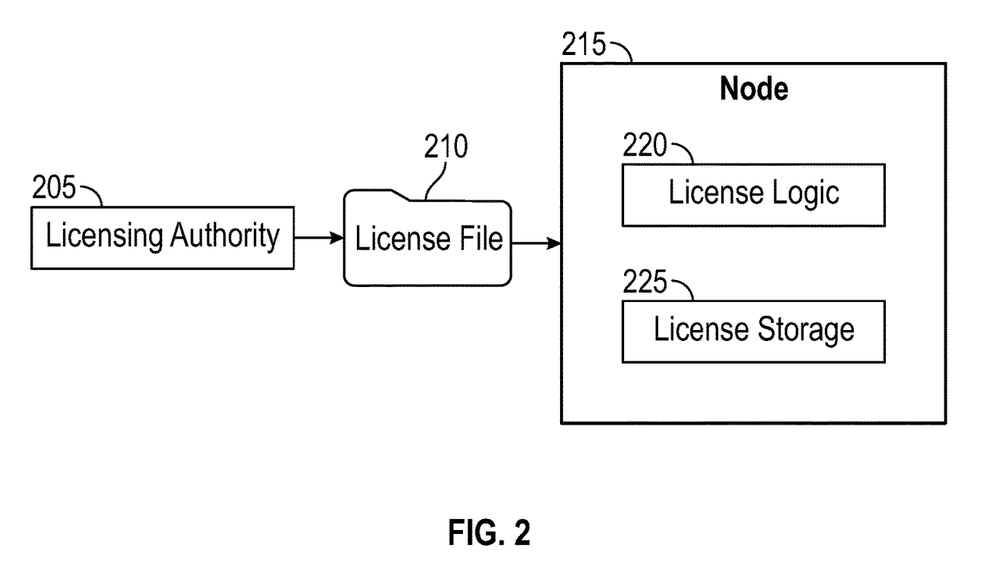
FIG. 2 is a block diagram depicting a system for the distribution of license information.

FIG. 2 is a block diagram depicting a system for the distribution of license information. In FIG. 2, a licensing authority 205 distributes a license file 210 to node 215. As described, a license may enable various aspects of a node, such as the use of an operating system, a feature of an operating system, a software application or a feature of a software application or a hardware component. Accordingly, license file 210 may enable access to a licensed aspect of node 215. Upon receipt by node 215, the license file 210 may be stored to a license storage 225 maintained locally by the node. The node 215 may then utilize license logic 220 in order to evaluate license files 210 that are stored in the license storage 225. For instance, license logic 220 may include instructions for authenticating and decoding the licensing information stored in a license file 210. License logic 220 may also provide the instructions necessary to determine the aspect of the node that is licensed by a particular license file 210.

In certain instances, the license storage 225 may include secured storage of the license files stored therein. In addition, the license information included in the license file may be encrypted or otherwise encoded to prevent unauthorized modifications to the license information. However, the storage of the license file 210 on the node 215 nonetheless subjects the license information to potential tampering. In addition, the license logic used to process a license file is not readily customized to accommodate license management that may be particularized for individual licenses.

Figure 3:
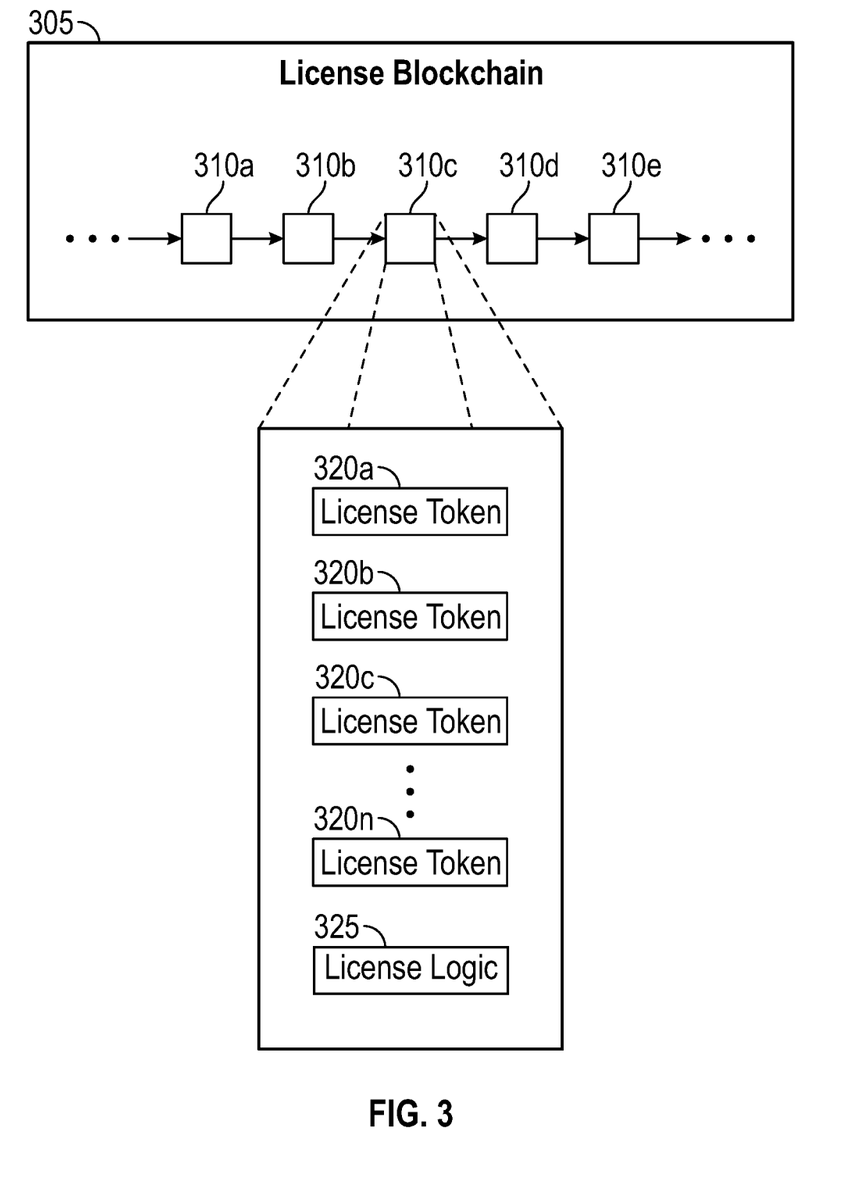
FIG. 3 is a block diagram depicting certain components of a blockchain for license management according to various embodiments.

FIG. 3 is a block diagram depicting certain components of a blockchain configured for license management according to various embodiments. The license blockchain 305 is comprised of a series of license blocks 310a-e. The illustrated license blockchain 305 is illustrated as a series of identically connected license blocks 310a-e that comprise the main chain of a license blockchain 305. In various scenarios, a license blockchain 305 may also include various segments that branch off from the main license blockchain 305 until a single main chain is re-established. Each node participating in the described blockchain-based license management system maintains a copy of the license blockchain 305 and may use this local copy to validate the integrity of the licensing transactions reported via the license blockchain.

Each of the license blocks 310a-e in the license blockchain 305 is timestamped and includes a cryptographic hash of the prior license block 310a-e in the chain. Within a license blockchain 305 recorded by a plurality of participating nodes, making a modification to one of the license blocks 310a-e would also require changes in all of the following license blocks in the license blockchain 305, effectively generating for all practical purposes an irreversible series of licensing transactions. Since a full copy of the license blockchain 305 is maintained at each participating node, any attempts to alter a license blocks 310a-e at a compromised node is detectable by the remaining participating nodes. The initialization and construction of license blockchain 305 is described with regard to the embodiment of FIG. 4. As illustrated, the contents of license block 310c may include one or more license tokens 320a-n and licensing logic 325.

Each of the license tokens 320a-n specify licensing information for a specific IHS participating in the blockchain-based license management system described herein. In certain embodiments, each license token 320a-n specifies whether a specific IHS is licensed to utilize each of the various features, applications, and components that require licenses and are managed by the blockchain-based license management system. For instance, each license token 320a-n may include a map of the aspects of a particular IHS that may be licensed and an indication regarding whether each of these licensable aspects is currently licensed for use on that particular IHS. The licensing logic 325 provides instruction for evaluating one or more of the license tokens 320a-c that are included in a licensing block 310c. For instance, the licensing logic 325 may provide instructions for determining the IHS that is the target of a specific license token 320a-n included in a licensing block 310c. The licensing logic 325 may also provide instructions for determining the aspects of an IHS that are licensed based on the license information provided in a license token. In certain embodiments, the license information encoded within a license token may be a series of bits that specify whether each of the licensable aspects of an IHS are licensed. These licensing bits may also specify a balance for a license token, thus indicating a duration for which an aspect of the IHS is licensed. In such embodiments, the license logic 325 may provide the instructions for interpreting the licensing bits of a license token in order to determine any modifications to the licensable aspects of the IHS that are specified by the license token.

Figure 4:
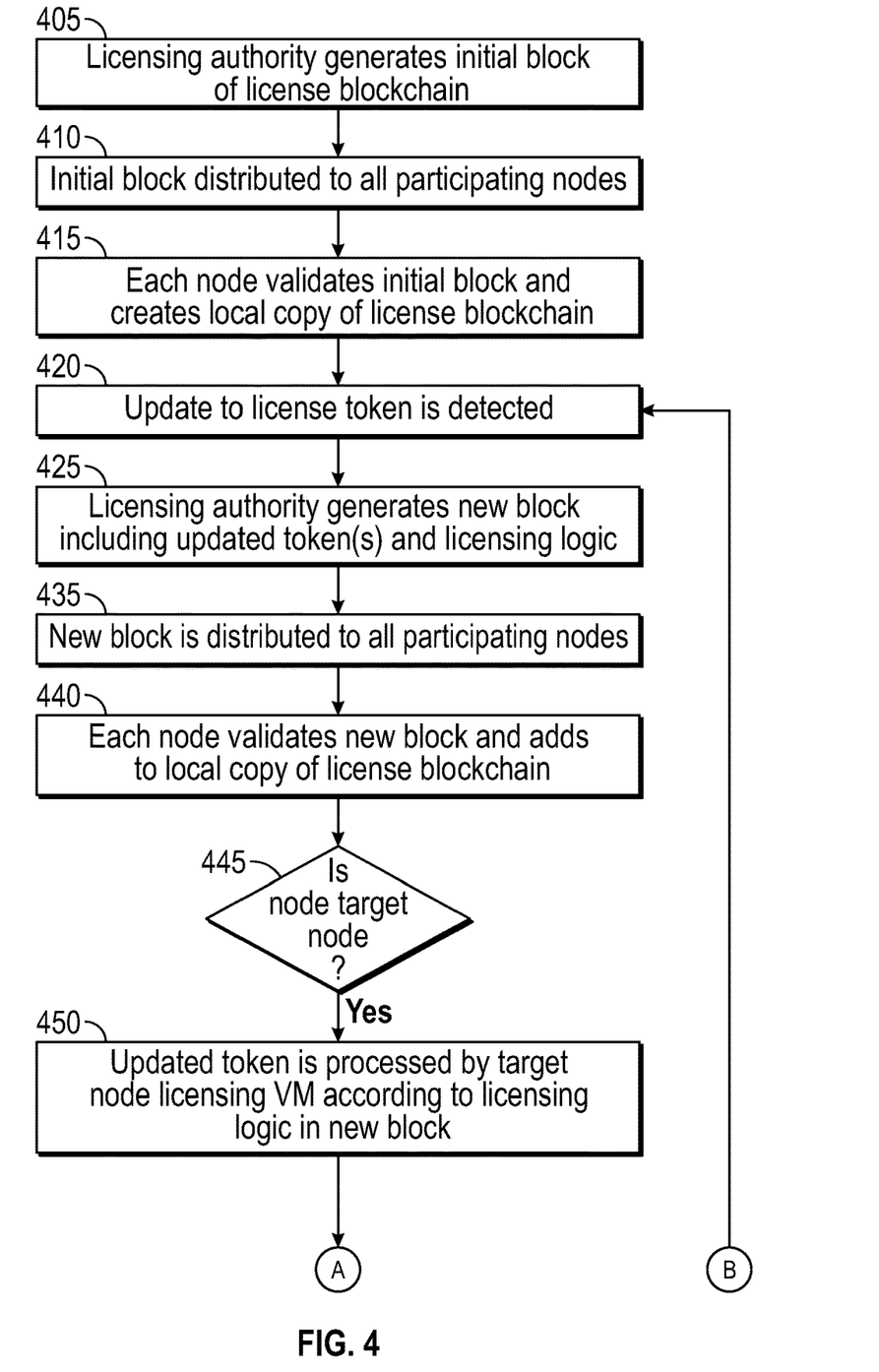
FIG. 4 is a flow chart illustrating certain steps of a process according to certain embodiments for blockchain-based license management.

FIG. 4 illustrates certain steps of a process according to various embodiments for a blockchain-based license management system. The illustrated embodiment begins at step 405 with the licensing authority generating the initial block of a license blockchain. This initial block of a blockchain may be referred to as a genesis block and may be a root block to which all blocks in the blockchain may be traced. In certain embodiments, this initial licensing block includes a licensing token for each IHS participating in the blockchain-based license management system. As described, each licensing token may include a map that specifies each of the aspects of an individual IHS that may be licensed. The map also indicates whether the individual IHS is currently licensed to utilize each of the aspects of the IHS available for licensing. As described, the licensing token may also specify a token balance that corresponds to the duration of license. Once the initial block of the license block chain is generated and digitally signed by the licensing authority, at step 410, this initial license block is distributed to all nodes participating in the blockchain-based license management system.

At step 415, the initial license block is received by each of the participating nodes. As described with regard to the embodiment of FIG. 1, an IHS that has been configured as a participating node may include a licensing virtual machine 113 that is implemented by a baseband management controller 117. In such embodiments, the licensing virtual machine of each participating node receives and validates the initial license block. In certain embodiments, the licensing virtual machine of each participating node may validate the authenticity of received blocks based on the digital signature of the licensing authority. Other embodiments may utilize additional protocols for validating this initial block of the license blockchain received from the licensing authority. Upon successfully validating the initial license block, each of the participating nodes initializes a local copy of the license blockchain and adds the initial license block to this local copy.

As described regard to FIG. 3, a license block may include one or more license tokens and licensing logic that provide instructions for evaluating the license tokens. Once the initial license block has been validated and the local block chain copy has been initialized, the licensing virtual machine of each participating node may then utilize the licensing logic in evaluating the license tokens included within the initial license block. In certain embodiments, the licensing virtual machine for a participating node determines whether a license token is directed to that node based on a public key used to encrypt the license token.

The licensing authority may modify the various licensable aspects of a participating node based on a variety of factors. For instance, in the configuration of a new participating node, the licensing authority may query a network service specifying the various licensable aspects of the new node for which a license has been purchased or otherwise selected. Additional licenses may be purchased or selected for a participating node as it is repurposed and reconfigured. Purchased licenses may expire, in which case the licensing authority may then revoke such licenses. Based on such a modification, at step 420, the licensing authority determines that an update to a license token that is included in the license blockchain is required.

At step 425, the licensing authority generates a new license block that includes an updated license token and corresponding licensing logic. The updated license token may specify one or more modifications to the aspects of a participating node that are licensed. The updated license token may also specify an updated token balance for a licensed aspect of a participating node. The licensing logic provides instructions by which a license token may be evaluated in order to determine the aspects of the participating node that are licensed and a token balance associated with each licensed aspect of the node. At step 435, the new license block generated by the licensing authority is distributed to all nodes participating in the blockchain-based license management system.

The new license block is distributed, and at step 440, the licensing virtual machine of each participating node validates the new license block. As with the initial block, in certain embodiments participating nodes may validate new license blocks based on confirmation that a digital signature included in the received license blocks corresponds to the licensing authority. If the digital signature included in the licensing block indicates the licensing block was generated by the licensing authority, the received licensing block may be at least partially validated by a participating node. In certain embodiments, participating nodes may validate received license blocks by performing various additional actions to ensure various conditions, such as confirming the new license block is well-formed and will be the most recently created license block in the local copy of the license block chain maintained by the participating node.

In certain embodiments, the participating nodes may also validate the licensing transactions that are specified in each of the license tokens included in the new license block. In certain embodiments, the license logic included within a licensing block may provide instructions allowing a participating node to validate the licensing transactions, such as the token balances, for every license block. However, in certain embodiments, the license logic may provide only a target node with the instructions required to execute licensing modifications based on a license token. In such embodiments, the licensing virtual machine of each participating node may be capable of validating the cryptographic integrity of the license blockchain and the integrity of each of the licensing transactions specified in the license blockchain, but may only have access to instructions required to execute license modification if the participating node is the target node. If the new license block is successfully validated, the licensing virtual machine of each participating node adds the new license block to the local copy of the license blockchain.

As described, the licensing authority may specify modifications to licensable aspects of a specific participating node by distributing license tokens that may be accessible exclusively to the specific target node using a public key associated with that target node. Upon receipt of a new license block, at step 445, the licensing virtual machine of a participating node determines whether the license tokens included in the new license block are targeted at that node. If the receiving node is the target of a license token included within a newly received license block, at step 450, the licensing virtual machine of the target node continues processing of the received license token.

Also as described, a license block includes license logic for use in evaluating one or more of the license tokens included in the license block. In certain embodiments, separate license logic may be included for each license token included within a license block. In certain embodiments, the license block may include general license logic for evaluating all license tokens included in the block, such as for validation of licensing transactions, and may also include specific license logic for evaluating specific license tokens. In such embodiments, the specific license logic may be encrypted or otherwise encoded such that only a node that is a target of a received license token may access the specific license logic associated with that license token.

According to the licensing logic included within the new license block, the licensing virtual machine of the target node determines the licensing modifications that are indicated by the licensing token. In certain embodiments, the licensable aspects of a particular node are indicated in a licensing token as a series of licensing bits that encode the various licensable aspects of the node. The licensing bits included in a licensing token may also specify a token balance for certain of the licensable aspects of the node, where a positive token balance indicates the particular aspects of the node are licensed, with the value of the token balance corresponding to the duration of the license. The license logic included within a license block provides the virtual licensing machine of the target node with the instructions by which the licensing bits of the licensing token may be evaluated, and by which token balances may be determined.

Based on the instructions provided by the licensing logic, at step 455, access to various aspects of the target node may be modified. For instance, the application of the license logic by the licensing virtual machine may determine that use a specific software application is no longer licensed by the target node. In that case, the licensing virtual machine may signal the operating system of the target node to disable access to that software application. Similarly, access to use of hardware resources, memory and storage resources, processing resources, and various other aspects of a participating node may be modified.

In certain embodiments, the license logic included within a license block may specify reporting instructions for the target node of the license block. For instance, the reporting instructions may direct the licensing virtual machine, at step 460, to periodically report use of licensed aspects of a participating node to the licensing authority. In certain embodiments, the participating nodes may comply with such reporting requirements included within licensing logic, at step 465, by transmitting the licensing token associated with the licensing logic back to the licensing authority. In this manner, the licensing authority may be periodically apprised of the use of licensed aspects of a participating node and a token balance maintained by the licensing authority may be decremented accordingly. When such token balance maintained by the licensing authority is exhausted, at step 470, the licensing authority may return to step 420 in order to issue an updated licensing token via a new licensing block, where the updated license token revokes access to the licensed aspect in light of the depleted token balance.

In certain embodiments, the participating nodes may transfer a license to another participating node by generating a new license block that is distributed to all of the participating nodes for incorporation into the license blockchain. In such embodiments, the new license block includes the license token and the corresponding license logic used in evaluating the license token. The transferred license token in the new license block may be targeted at a specific node by the transferring node using a public key associated with that node. Once the new license block is distributed, each participating node validates the new license block and adds it to the license blockchain. The participating node that is the target node evaluates the transferred license token using the license logic provided in the new license block. This license logic included in the new license block by the transferring node is the same license logic that was distributed by the licensing authority in conjunction with the license block that is being transferred. Upon generating the new license block for transferring the license token, the licensing virtual machine of the transferring node initiates corresponding modifications to the licensed aspects of the transferring node, such as disabling access to features for which the license token is being transferred.

The participating nodes receives the new license block distributed by the transferring node. Upon validation of the new license block and determination that the new license block includes at least one license token directed to the target node, the participating node that is the target of the transferred token utilizes this license logic to determine licensing modifications on the target node. Also according to the license logic, the target node resumes the periodic reports to the licensing authority, thus allowing the licensing authority to continue tracking the token balance associated with the transferred token. In this manner, a license may be transferred directly between participating nodes, while generating an auditable record in the license blockchain of the license transfer transaction.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method for managing licensable aspects of a first IHS (Information Handling System) of a plurality of IHSs participating in a blockchain, the method comprising:

receiving a first block of the blockchain that specifies software and hardware components of the first IHS that have been enabled for use, wherein the first block includes one or more encrypted license tokens and further includes license logic, and wherein the license tokens specify the software and hardware components of the first IHS that have been enabled for use, and wherein the license logic provides instructions for determining whether the first block is targeted at the first IHS;

authenticating the received first block;

after the received first block is authenticated, adding the received first blockto a local copy of the blockchain maintainedby the first IHS;

determining, using the license logic included in the first block, the first IHS is a target of the received first block, wherein the first IHS is determined to be the target of the first block by determining the license logic has access to a key that decrypts the license tokens of the first block;

after the first IHS is determined as the target of the received first block, determining, using the license logic included in the first block, one or more modifications to the software and hardware components of the first IHS that are enabled for use based on information specified in the license tokens included in the first block;

generating a second block of the blockchain, wherein the second block comprises a transfer license token corresponding to a transfer of a license from the first IHS to a second IHS of the participating IHSs, and wherein the second block further comprises additional license logic; and transmitting the second block to the participating IHSs.

2. The method of claim 1, wherein the received first block is authenticated based on validation of a digital signature included in the received block.

3. The method of claim 1, wherein each of the license tokens comprises a token balance indicating the duration of a license specified by a respective license token.

4. The method of claim 1, wherein the key that decrypts the license tokens of the first block comprises a private key of a keypair of the first IHS.

5. The method of claim 1, wherein the license logic is used to process the license tokens to determine the hardware and software components of the first IHS that are enabled for use by a licensing virtual machine operating on the first IHS.

6. The method of claim 5, wherein the license logic further comprises instructions directing the licensing virtual machine to issue periodic reports to the licensing authority regarding the hardware and software components of the IHS that are enabled for use.

7. The method of claim 1, wherein the additional licensing logic is utilized by the second IHS to process the transfer license token to enable one or more components of the second IHS.

8. A first Information Handling System (IHS) of a plurality of IHSs participating in a blockchain, the IHS comprising:

one or more processors;

a baseboard management controller configured to operate a licensing virtual machine for managing licensable aspects of the first IHS, wherein the licensing virtual machine is configured to:

receive a first block of the blockchain, wherein the first block includes one or more encrypted license tokens and further includes license logic, and wherein the license tokens specify software and hardware components of the first IHS that have been enabled for use, and wherein the license logic provides instructions for determining whether the first block is targeted at the first IHS;

authenticate the received first block;

after the received block is authenticated, add the received first blockto a local copy of the blockchain maintainedby the first IHS;

determine, using the license logic included in the first block the first IHS is a target of the received first block, wherein the first IHS is determined to be the target of the first block by determining the license logic has access to a key that decrypts the license tokens of the first block;

after the first IHS is determined as the target of the received first block, determine, using the license logic included in the first block the one or more modifications to the software and hardware components of the first IHS that are enabled for use based on information specified in the license tokens; and a system memory coupled to the one or more processors, the system memory including program instructions stored thereon that, upon execution by the one or more processors, cause the IHS to:

enable the one or more of the components of the first IHS that are determined by the virtual machine operating o n the baseboard management controller in evaluation of the received first block;

wherein the licensing virtual machine is further configured to:

generate a second block of the blockchain, whereinthe second block comprises a transfer license token corresponding to a transfer of a license from the first IHS to a second IHS of the participating IHSs, and wherein the second block further comprises additional license logic; and transmit the second block to the participating IHSs.

9. The IHS of claim 8, wherein each of the license tokens comprises a token balance indicating the duration of a license specified by a respective license token.

10. The IHS of claim 8, wherein the key that decrypts the license tokens of the first block comprises a private key of a keypair of the first IHS.

11. The IHS of claim 8, wherein the license logic is used to process the license tokens to determine the hardware and software components of the first IHS that are enabled for use by the licensing virtual machine operating on the first IHS.

12. The IHS of claim 11, wherein the license logic comprises instructions directing the licensing virtual machine to issue periodic reports to the licensing authority regarding the hardware and software components of the IHS that are enabled for use.

13. The IHS of claim 8, wherein the additional licensing logic is utilized by the second IHS to process the transfer license token to enable one or more components of the second IHS.

14. The IHS of claim 13, wherein the licensing virtual machine is further configured to:

authenticate the received first block by validating a digital signature included in the first block.

15. A computer-readable storage device having instructions stored thereon for managing licensable aspects aspect of a first IHS (Information Handling System) of a plurality of IHSs participating in a blockchain, wherein upon execution by one or more processors, the instructions cause the one or more processors to:

receive a first block of the blockchain that specifies software and hardware components of the first IHS that have been enabled for use, wherein the first block includes one or more encrypted license tokens and further includes license logic, and wherein the license tokens specify the hardware and software components of the first IHS that have been enabled for use, and wherein the license logic provides instructions for determining whether the first block is targeted at the first IHS;

authenticating the received first block; after the received first block is authenticated, add the received first blockto a local copy o f the blockchain maintained by the first IHS;

determine, using the license logic included in the first block whether the first IHS is a target of the received first block, wherein the first IHS is determined to be the target of the first block by determining the license logic has access to a key that decrypts the license tokens of the first block; and after the first IHS is determined as the target of the received first block, determine, using the license logic included in the first block the one or more modifications to the software and hardware components first IHS that are enabled for use based on information specified in the license tokens;

generate a second block of the blockchain, wherein the second block comprises a transfer license token corresponding to a transfer of a license from the first IHS to a second IHS of the participating IHSs, and wherein the secondblock further comprises additional license logic; and transmit the secondblock to the participating IHSs.

16. The storage device of claim 15, wherein the received first block is authenticated based on validation of a digital signature included in the received first block.

17. The storage device of claim 15, wherein each of the license tokens comprises a token balance indicating the duration of a license specified by a respective license token.

18. The storage device of claim 15, wherein the key that decrypts the license tokens of the first block comprises a private key of a keypair of the first IHS.

* * * * *

UNITED STATES PATENT AND TRADEMARK OFFICE
CERTIFICATE OF CORRECTION

PATENT NO. : 11,487,852 B2
APPLICATION NO. : 16/018564
DATED : November 1, 2022
INVENTOR(S) : Rahiman et al.

It is certified that error appears in the above-identified patent and that said Letters Patent is hereby corrected as shown below:

In the Claims

In Column 13, Line 13, Claim 1, delete "blockto" and insert -- block to -- therefor.

In Column 13, Line 14, Claim 1, delete "maintainedby" and insert -- maintained by -- therefor.

In Column 14, Line 8, Claim 8, delete "blockto" and insert -- block to -- therefor.

In Column 14, Line 9, Claim 8, delete "maintainedby" and insert -- maintained by -- therefor.

In Column 14, Line 28, Claim 8, delete "o n" and insert -- on -- therefor.

In Column 14, Line 32, Claim 8, delete "whereinthe" and insert -- wherein the -- therefor.

In Column 14, Line 63, Claim 15, delete "licensable aspects aspect" and insert -- licensable aspects -- therefor.

In Column 15, Line 11, Claim 15, insert a [HARD RETURN] after the word "block;".

In Column 15, Line 13, Claim 15, delete "blockto" and insert -- block to -- therefor.

In Column 15, Line 13, Claim 15, delete "o f" and insert -- of -- therefor.

Signed and Sealed this
Sixth Day of December, 2022

Katherine Kelly Vidal
*Director of the United States Patent and Trademark Office*